(12) United States Patent
Swedowicz et al.

(10) Patent No.: US 9,963,988 B2
(45) Date of Patent: May 8, 2018

(54) SELF-ADJUSTING DEVICE FOR CONTROLLING THE CLEARANCE BETWEEN ROTATING AND STATIONARY COMPONENTS OF A THERMALLY LOADED TURBO MACHINE

(71) Applicant: Ansaldo Energia Switzerland AG, Baden (CH)

(72) Inventors: Jaroslaw Leszek Swedowicz, Bad Zurzach (CH); Alexey Mozharov, Nussbaumen (CH); Florian Schiedeck, Beyreuth (DE); Jonas Boettcher, Hannover (DE)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 560 days.

(21) Appl. No.: 13/621,401

(22) Filed: Sep. 17, 2012

(65) Prior Publication Data

US 2013/0101391 A1 Apr. 25, 2013

(30) Foreign Application Priority Data

Sep. 19, 2011 (CH) ...................................... 1551/11

(51) Int. Cl.
*F01D 11/00* (2006.01)
*F01D 11/18* (2006.01)
*F03G 7/06* (2006.01)

(52) U.S. Cl.
CPC .............. *F01D 11/00* (2013.01); *F01D 11/18* (2013.01); *F03G 7/065* (2013.01); *F05D 2300/505* (2013.01); *Y02T 50/671* (2013.01)

(58) Field of Classification Search
CPC ........... F05D 2300/505; F05D 2260/30; F01D 11/14; F01D 11/08; F01D 11/16;
(Continued)

(56) References Cited

U.S. PATENT DOCUMENTS 3,975,901 A 8/1976 Hallinger et al.
5,330,321 A 7/1994 Roberts et al.
(Continued)

FOREIGN PATENT DOCUMENTS

GB 2354290 3/2001
JP 57-195803 12/1982
(Continued)

OTHER PUBLICATIONS

Search Report for Swiss Patent App. No. 01551/11 (dated Jan. 4, 2012).
(Continued)

*Primary Examiner* — Jason Shanske
*Assistant Examiner* — Alexander White
(74) *Attorney, Agent, or Firm* — Buchanan Ingersoll & Rooney PC (57) ABSTRACT

A self-adjusting device for controlling the clearance (C), especially in the radial direction, between rotating and stationary components of a thermally loaded turbo machine, changes clearance (C) in a linear and/or non-linear way during transition of the machine between standstill and steady-state operation. Simple and effective control can be achieved, even in the case of a nonlinear variation of the clearance during transitional operation, by the self-adjusting device including at least two different driving elements (A, B) to move the rotating and fixed components relative to each other in order to change the clearance (C) between them, and by the different driving elements (A, B) being configured to be activated at different times during the transition of the machine.

2 Claims, 6 Drawing Sheets (58) Field of Classification Search
CPC .......... F01D 11/18; F01D 11/20; F01D 11/22; F01D 11/24; F01D 11/12
See application file for complete search history.

(56) References Cited

U.S. PATENT DOCUMENTS

| | | | |
|---|---|---|---|
| 6,684,904 B2 * | 2/2004 | Ito | F16K 31/52425 137/530 |
| 7,367,776 B2 * | 5/2008 | Albers | F01D 11/18 415/173.1 |
| 8,142,141 B2 | 3/2012 | Tesh et al. | |
| 2006/0165518 A1 | 7/2006 | Albers et al. | |
| 2010/0054911 A1 | 3/2010 | Wilson et al. | |
| 2010/0054912 A1 | 3/2010 | Wilson et al. | |
| 2010/0104416 A1 * | 4/2010 | Willett, Jr. | 415/48 |
| 2010/0239414 A1 * | 9/2010 | Tesh et al. | 415/173.7 |
| 2010/0276025 A1 * | 11/2010 | Sellers | F03G 7/065 138/45 |
| 2011/0030380 A1 * | 2/2011 | Widdle, Jr. | F02K 1/10 60/771 |

FOREIGN PATENT DOCUMENTS

| | | |
|---|---|---|
| JP | 58-206805 A | 12/1983 |
| JP | 58-206806 | 12/1983 |
| JP | 61-103504 | 7/1986 |
| JP | 2006-207584 A | 8/2006 |
| JP | 2010-223227 A | 10/2010 |

OTHER PUBLICATIONS

Office Action (Notification of Reasons for Refusal) dated Jan. 5, 2015, by the Japanese Patent Office in corresponding Japanese Patent Application No. 2012-206199, and an English Translation of the Office Action. (13 pages).

Office Action (Notification of Reasons for Refusal) dated Sep. 14, 2015 by the Japanese Patent Office in corresponding Japanese Patent Application No. 2012-206199, and an English translation thereof (12 pages).

* cited by examiner

SELF-ADJUSTING DEVICE FOR CONTROLLING THE CLEARANCE BETWEEN ROTATING AND STATIONARY COMPONENTS OF A THERMALLY LOADED TURBO MACHINE

This application claims priority under 35 U.S.C. 119 to Swiss App. No. 01551/11, filed 19 Sep. 2011, the entirety of which is incorporated by reference herein.

BACKGROUND

Field of Endeavor

The present invention relates to the technology of turbo machines, such as compressors or gas turbines, or others. It relates more specifically to a self-adjusting device for controlling the clearance, especially in a radial direction, between rotating and stationary components of a thermally loaded turbo machine.

Brief Description of the Related Art

Minimization of clearances, particularly radial ones between stationary and rotating parts of a turbo machine, e.g., steam- or gas turbines, jet-engines, compressors, and turbochargers, during operation is essential for minimizing flow-losses and subsequently maximizing the efficiency of such engines.

Figure 1:
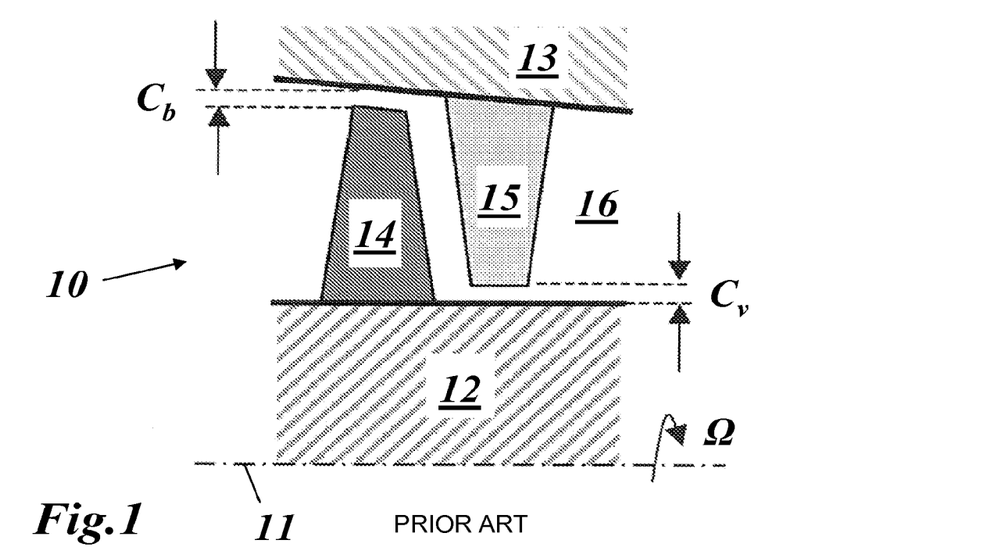
FIG. 1 shows part of the turbo machine stage with blades and vanes and the fluid channel defined between a rotating shaft and a stationary housing.

For illustrative purposes, FIG. 1 shows an example of a turbine configuration, the turbo machine stage 10 including a blade 14 and a vane 15, mounted to a rotating shaft 12 (rotating with rotational velocity Ω around an axis 11) and a housing part 13, respectively, whereby a fluid channel (hot gas channel for gas turbines) 16 is defined between the shaft 12 and the housing 13. By minimizing the radial clearances $C_b$ (blade clearance) and $C_v$ (vane clearance) leakage flows across the blade- and vane-tips and, consequently, flow-losses can be reduced. Radial clearances may be formed by cylindrical or conical surfaces of the respective rotor and stator components. However, although having basically a cylindrical or conical shape, every part might have additional shape features.

Due to the relative movement, e.g., between the blade tip of blade 14 and the housing 13, it is not possible to set the radial clearance $C_b$ to zero. Contact between these parts during operation may lead to damage or even destruction of the entire engine.

In general, by designing such an engine, the radial clearance during operation ("hot-clearance") is determined by a number of factors, which need to be considered with respect to the assembly clearances ("cold clearances" under standstill conditions for a "cold" engine, usually meaning ambient temperature):

Manufacturing tolerances
Assembly tolerances
Deformation of shaft 12 and housings 13 under steady-state operation conditions (e.g., ovalization of the casing from the demand circular shape)
Blade/Vane expansion during operation due to thermal growth and centrifugal forces
Time-dependent deformations and relative movements during engine transient operation, like start-up and shut-down of the engine.

Figure 3:
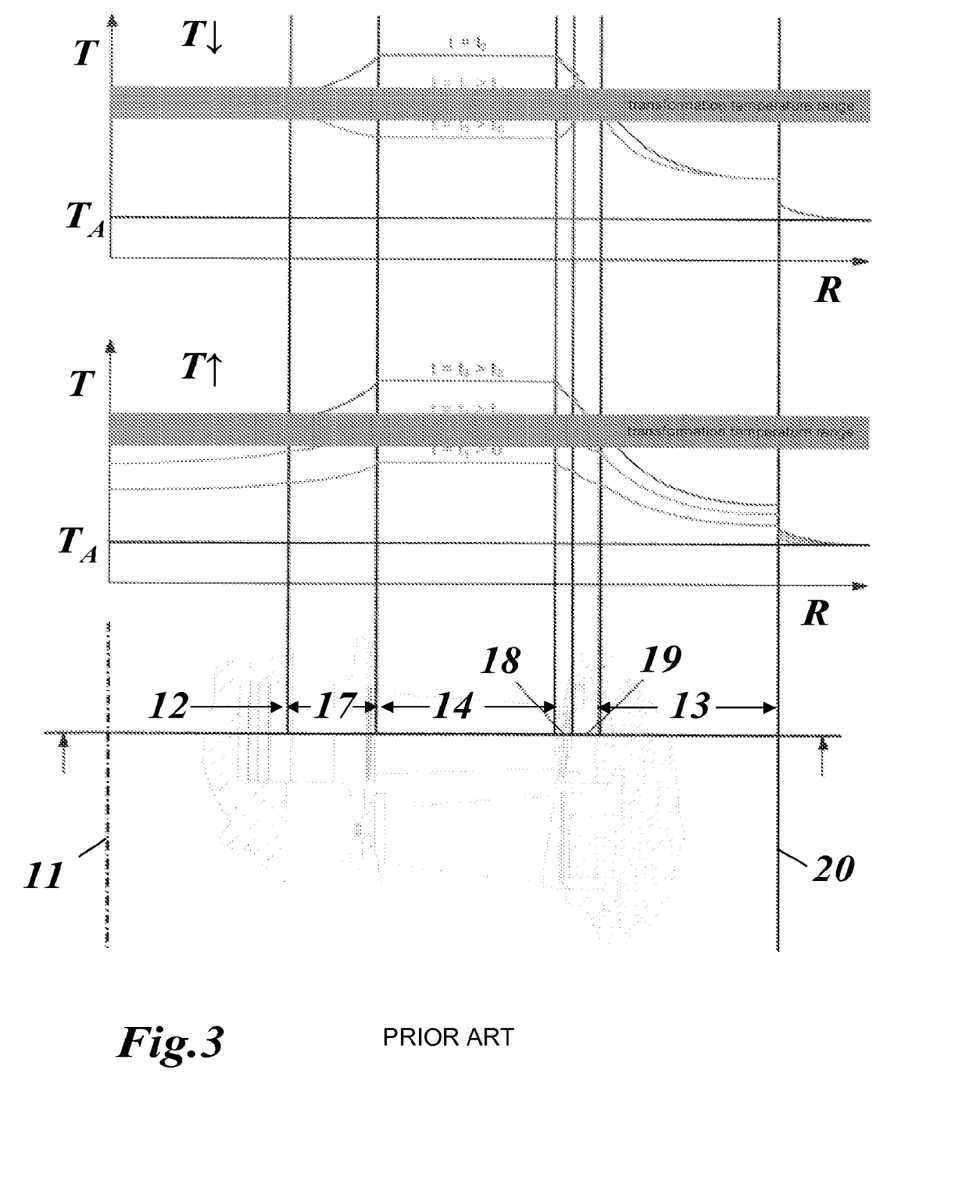
FIG. 3 shows the radial variation of temperature of a turbo machine during cooling and heating for various points in time.

The latter two factors, transient and steady state thermal expansions, are driven by the temperature differences within the engine. The typical temperature distribution within, e.g., a turbine, leads to a non-constant temperature profile at a certain axial position with respect to the radial direction (temperature gradient in the radial direction). The highest temperature is assumed to be in the fluid channel 16, where the blades 14 and vanes 15 are placed. The ambient temperature is $T_A$. FIG. 3 shows the spatial (radial, i.e., dependent on the radius R) temperature distributions within a turbine at different points in time ($t_1$-$t_6$).

Radial sections in FIG. 3 are defined by constructional features of the turbine, namely the shaft 12, the blade 14, the housing 13, the foot 17 of the blade 14, a heat shield 18 opposite the tip of blade 14, a chamber 19 behind heat shield 18, and the outer surface 20 of the machine. The upper part of FIG. 3 shows possible variation of the temperature distribution T(R) along the radial direction R during cooling (T↓) at instants $t_3$-$t_6$ in the time domain t. The lower part of FIG. 3 shows the possible variation of the temperature distribution T(R) during heating (T↑) at instants $t_1$-$t_3$. In both cases a transformation temperature range is illustrated by a shadowed bar in FIG. 3. It can be seen that the variation in time of the temperature during transient operation (heating/cooling) is a maximum at the blades 14 in the fluid channel 16.

In particular, the time-dependent deformations and relative movements of the main components during engine transient operations are of significance for determining the cold standstill clearances $C_{ss}$ and for the resulting steady-state hot or nominal clearances $C_{nom}$. The design target is to determine the cold clearances so that, during steady-state conditions, the resulting hot clearances $C_{nom}$ are minimized. However, due to the different geometrical dimensions, materials and heat capacities of blading, housings, and shafts during warm-up (start-up) or cool-down (shut-down) of the engine, the minimum hot clearance may not appear at the hot steady-state condition, where the minimum clearances are desirable. Furthermore, taking into account that the engine may also experience rapid load-changes or may be started, when major components are still hot from a previous operation period, the minimum possible clearances during operation ("pinch-point", $C_{pp}$ in FIG. 2) may appear sometimes during the transient engine operation (in a start-up condition S-U but not in a steady-state condition S-S, see FIG. 2(a)). In that case, it is necessary to further increase the cold-clearances to avoid "hard" contact between stationary and rotating parts during such transient operation, which then results in a larger than desired hot clearance under steady-state conditions.

Figure 2:
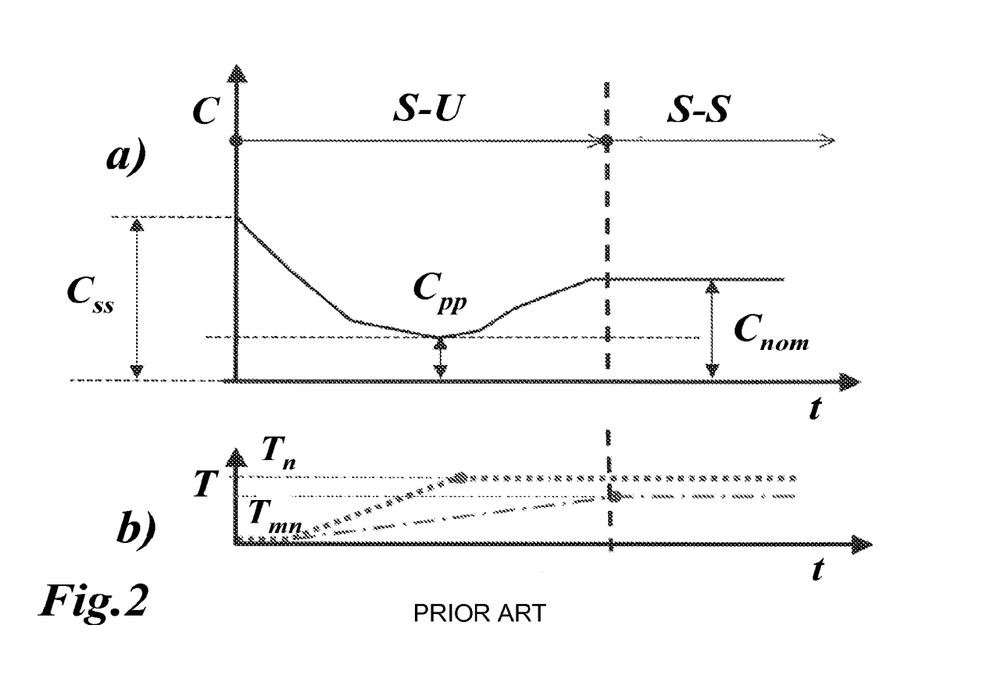
FIG. 2 shows an exemplary curve of the time-dependent clearance of a turbo machine stage during transitional operation (FIG. 2(a)) and the difference in time-dependency of the temperatures of the working fluid and metal parts of the turbo machine during transitional operation (FIG. 2(b))

For example, during start-up of the engine, the thermal expansion of the blading is typically much faster than those of casing parts or shaft, which has higher thermal inertia due to the bigger mass in comparison to the blading. Thus, heating up and thermal expansion of shaft or structural parts (dash-dotted line in FIG. 2(b)) continue even after the working fluid temperature (dotted line in FIG. 2(b)) reached the nominal level $T_n$, to finally reach a nominal (metal) level $T_{mn}$.

Furthermore, the casings and shafts are typically not directly exposed to the hot gases. This fact leads to so called pinch-point, which means the time instant, when the radial clearance reaches its minimal value ($C_{pp}$). Therefore, for the nominal steady-state operation condition, the resulting nominal clearance $C_{nom}$ must involve a clearance value covering pinch-point and further thermal expansions, which are analytically determined based on thermal boundary conditions, dimensions and material properties of the rotating and stationary components.

Known measures to minimize the flow-losses caused by remaining hot-clearances are e.g., introducing shrouds on the tips of the blade and vane airfoils. In order to minimize the flow through the annular gap formed by the shroud and the casing or rotor, rows of fins are applied onto the rotating part, while the surface of the stationary part may be flat or stepped, overall forming a labyrinth seal.

Furthermore, honeycombs may be attached on the surface of the stationary part, allowing the fins to cut into the honeycombs during transient operation, thus forming a stepped labyrinth and further reducing leakage flows during steady-state operation. A further known measure to minimize the hot clearances is to use so called leaf- or brush-seals attached to the stationary part, which can accommodate some variation in the clearance during transient operation.

Finally, the use of a combination of abrasive features and abradable coatings on the opposite parts can be used to mitigate the effect of circumferential clearance variations, e.g., caused by ovalization of structural parts or some eccentricity of the shaft within the casing.

While all the above mentioned solutions are purely passive systems, which allow minimizing hot clearances without any adjustment to the temperature, pressure and other loadings during operation, there are also a number of other active clearance reduction measures known.

A system has been described, where the complete rotor of a gas turbine is shifted axially after the engine has reached its steady-state condition. In combination with a conical fluid flow path, this allows actively minimizing the hot turbine clearances and can be combined with any of the above mentioned passive measures. However, since the whole rotor train needs to be moved, this also results in some increase of clearances on the compressor side. Therefore, this measure will only be beneficial as long as the gains in the turbine outweigh the additional losses on the compressor side.

Instead of a general axial shaft movement, solutions for every turbine stage have been proposed by controlling either the radial thermal blade/vane expansion or a spring system, which allows for an additional radial movement of the heat shield (see for example U.S. Pat. No. 7,596,954 B2).

U.S. Patent Application Pub. No. 2009/0226327 A1 describes a sleeve made of shape memory alloys, which is assembled in the rotor disc. In terms of the surrounding temperature, the sleeve throat controls the coolant flow mass into the turbine blade. By getting less coolant, the blade expands thermally to reduce a gap between its airfoil tip and a casing. By providing more coolant, the blade contract to increase a radial gap of the turbine stage.

Document GB 2 354 290 A describes the shape memory alloy valve mounted within cooling passage of the gas turbine blade. This shape memory alloy valve allows regulating the use of coolant in response to the temperature of the component. However, GB 2 354 290 A does not claim solution for clearance control for the rotating blade and stationary vanes.

U.S. Pat. No. 7,686,569 B2 presents a system for the axial movement of the blade ring driven by a pressure differential supplied across the blade ring, the thermal expansion and/or contraction of a linkage or by a piston. A shape memory alloy can also trigger the required movement.

In general, different passive, semi-active, and active systems can be considered for clearance management between the blade 14 and housing 13 as well the vane 15 and rotor or shaft 12. Clearance $C_b$ or $C_v$ (FIG. 1) denotes a relative distance between the rotating and stationary component, that varies with different rates during transient operation conditions, like the start-up or shut-down of the engine, due to the different thermal inertia of the various engine components, depending on their volumes, exposure to hot or cold fluids, and the thermal properties of the alloys involved.

Because of these differences, a "hot" clearance $C_{nom}$ under the steady-state operation condition needs to include the transient contribution $C_{nom}$-$C_{pp}$ corresponding to the difference of the thermal expansions of the rotating and stationary components during transient operation of the engine. This difference has to be taken into account during the definition of cold-built clearance, worsening the aerodynamical efficiency of the turbo machine. The ultimate target is to keep always the radial clearance as small as $C_{pp}$ during the whole time of the engine operation.

SUMMARY

One of numerous aspects of the present invention includes a self-adjusting device for controlling the clearance, which can avoid disadvantages of prior art devices, is of simple construction and allows the safe control of clearances even in cases where the clearance runs through a minimum during transitional operation of the machine.

Another aspect includes a self-adjusting device that includes at least two different driving elements to move the rotating and fixed components relative to each other in order to change the clearance between them, and the different driving elements are configured to be activated at different times during the transition of the machine.

An embodiment is characterised in that the clearance runs through a minimum during transition of the machine between standstill and steady-state operation, and one of the at least two different driving elements is configured to reduce the distance between the rotating and stationary components, and another of the at least two different driving elements is configured to increase the distance between said rotating and stationary components when activated.

According to another embodiment, the at least two different driving elements are automatically activated when a predefined activation temperature is reached.

In particular, the at least two different driving elements have the same activation temperature but are arranged within the self-adjusting device such that they reach their activation temperature at different times during the transition of the machine.

Alternatively, the at least two different driving elements have different activation temperatures and are arranged within the self-adjusting device such that they experience the same or nearly the same temperature conditions during the transition of the machine.

According to another embodiment, the self-adjusting device is configured to effect a movement of the rotating and stationary components relative to each other in the radial and/or axial direction.

Another embodiment is characterised in that the rotating and stationary components comprise rotating blades and/or stationary vanes, especially of a compressor or gas turbine, said rotating blades and/or stationary vanes being provided with respective blade/vane tips, and associated heat shields, which are arranged opposite to the respective blade/vane tips, and the self-adjusting device is, either directly or via a mechanical transmission, drivingly connected to at least one of said associated heat shields.

Yet another embodiment is characterised in that said driving elements comprise bimetal and/or a shaped memory alloy systems and/or any other material, which deforms in an elastic, super-elastic or pseudo-elastic manner above a threshold value of temperature, pressure, or mechanical loading.

According to another embodiment, said driving elements directly sense a temperature at the turbo machine and are activated when said sensed temperature reaches their activation temperature.

Another embodiment is characterised in that a temperature at the turbo machine is sensed by a separate temperature sensor and said driving elements are activated by an activation mechanism or circuit, when said sensed temperature reaches their activation temperature.

According to another embodiment, the driving elements are in the form of a spring or other devices having the capability of storing and releasing potential energy.

In particular, the driving elements are combined with return springs acting in a direction opposite to the respective driving element.

According to another embodiment, the component to be moved is moveably supported in a support and the driving elements are arranged between the component to be moved and the support.

BRIEF DESCRIPTION OF THE DRAWINGS

The present invention is now to be explained more closely by different embodiments and with reference to the attached drawings.

DETAILED DESCRIPTION OF EXEMPLARY EMBODIMENTS

The present disclosure is directed to the application of a self-adjusting device or system (SAS), including bimetal and/or a shaped memory alloy (SMA) systems and/or any other material, which deforms in an elastic, super-elastic or pseudo-elastic manner above a threshold value of temperature, pressure or mechanical loading. The systems may be actively or passively triggered. They are installed within the assembly section of a turbine- or a compressor blade, a stator- or a rotor heat-shield, a vane-carrier or other rotating or stationary components assembled to the rotor or outer casing of a turbo machine aiming to minimize the clearances during operation.

In the following, the assembly of a turbine stator heat shield within a stator is chosen as an exemplary application, but the disclosure is not limited to heat shields only.

The compensation for thermal expansions inside the engine is carried out by attaching driving elements or SAS members to the heat shields surrounding the turbine blades and vanes. Once the activation temperature of a driving element or SAS member is reached, the attached heat shield performs a movement away from or towards the engine axis 11.

Figure 4:
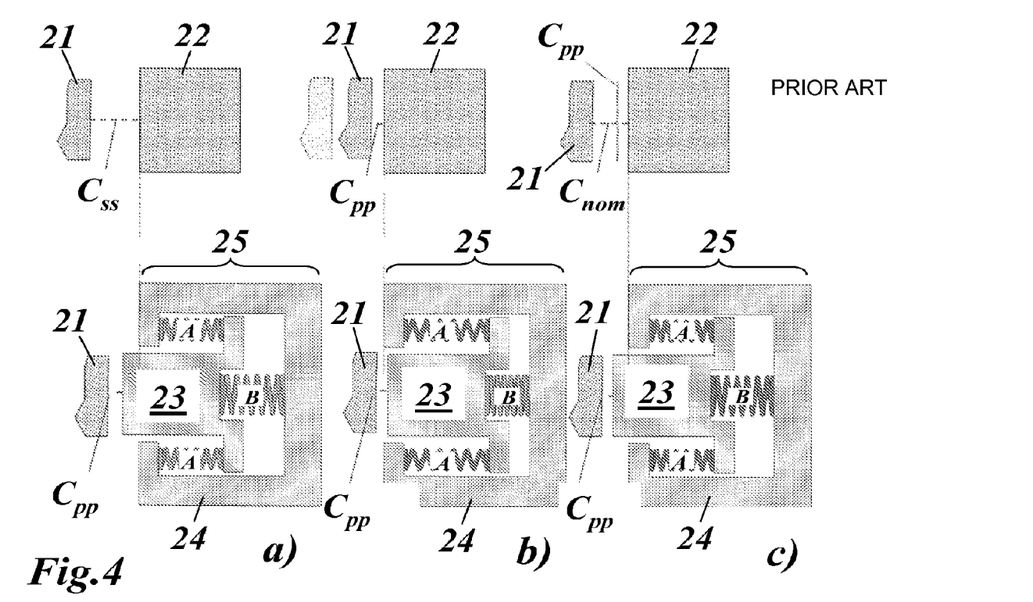
FIG. 4 shows the principle scheme of a self-adjusting device according to an embodiment of the invention with two different driving elements A and B in comparison with a non-controlled clearance in the standstill condition (a), under transient condition (b), and in the nominal operation condition (c)

This principle is illustrated in FIG. 4 by comparison of conventional state-of-the-art clearances behavior (upper part of FIG. 4) with SAS-controlled clearance behavior (lower part of FIG. 4). Shown in FIG. 4 is the relative distance between blade/vane tip 21 and an associated stationary heat shield 21 (upper part of FIG. 4) or a moveable and controllable heat shield 23 of a self-adjusting device 25 (lower part of FIG. 4).

When the turbine starts to operate, the temperature within the turbine increases up to its operating point. Due to the lower heat capacity of the blades with respect to the rotor, the blades expand thermally before the rotor is axially displaced relatively to the stator due to the difference in the thermal expansions of the rotor and stator. This means that the heat shields 23 must be moved in a way to increase the stator parts' radius at this certain axial location in a first step (a)→(b) in order to keep the clearance C between the rotor blades (blade tips 21) and casing (heat shield 23) constant. In the second step (b)→(c) the heat shields 23 must be moved to reduce the stator parts' radius at this certain axial location, since the rotor blades have an inclined outer surface in the axial direction and since the rotor is axially displaced relatively to the stator due to the difference in the thermal expansions of the rotor and stator.

The number of such operational steps is not limited to two and can be as numerous as required by operational and design considerations.

The two-step movement explained above can be performed by an agonist-antagonist configuration of two or more different driving elements or SAS packages A and B shown in FIG. 4, which could be, for instance, shape memory alloy (SMA) members. These members could be composed out of one or more springs of arbitrary shape, for example coil or leaf springs; an arbitrary shape of the spring can be used. The heat shield 23 is moveably mounted within a support 24 in a kind of piston-cylinder arrangement. Driving elements A and B are provided to move the heat shield 23 in the support in opposite directions.

With increasing temperatures of the engine components, also the temperature of the driving elements A and B starts to rise, due to heat transfer processes around the location of the driving elements A and B. This temperature increase can drive a shape change of the SMA driving elements A and B.

The agonist driving element or SMA package A, when expanding, increases the radius of the inner surface of the heat shields 23 (FIG. 4(b)), while the antagonist driving element or SMA package B, when expanding, decreases the radius of the inner surface of the heat shields 23 (FIG. 4(c)). Thereby, the agonist driving element or SMA package A is activated at lower temperature or at earlier time during heating-up of the casing and the antagonist driving element or SMA package B is activated at higher temperature or at later time during heating-up of the casing. Any of members A or B or others could be made of parallel or serial spring systems or their combination due to design requirements. Every spring could be made of the same or different material with respect to other springs.

The shape of the self-adjusting device can be arbitrary and may generally depend on the available design space. The crucial matter in the shape of the self-adjusting device is the dimension, enabling to move a heat shield 23 away from a blade or vane tip 21 by the difference of $C_{nom}$–$C_{pp}$, as shown in FIG. 4.

Several embodiments of self-adjusting devices according to principles of the invention are described below. These descriptions based on the SMA properties are useful to understand the principle of the disclosure. Nevertheless, the self-adjusting devices may use other materials and be arranged in other configurations.

SMA Driving Elements or Packages with Identical Transformation (Activation) Temperatures Several driving elements made of the same SMA are placed at different positions with regard to the radial distance. Due to the thermal gradient within the housing (see FIG. 3), the driving elements or SMA devices will be activated at distinct times when the temperature within the turbine is increasing and heating the housing. One driving element or SMA package is placed at the radial distance in such a manner that it is activated at time $t=t_2$. Another driving element or SMA package is placed at a greater radial distance compared to the first package and is activated at time $t=t_3$ (see FIG. 3).

SMA Driving Elements or Packages with Different Transformation (Activation) Temperatures Several SMA packages are applied in series, where the SMA within the particular packages has the same transformation temperatures but the SMA of different packages have different transformation temperatures. Therefore, the particular packages are activated at different temperatures and perform an incremental displacement.

Figure 5:
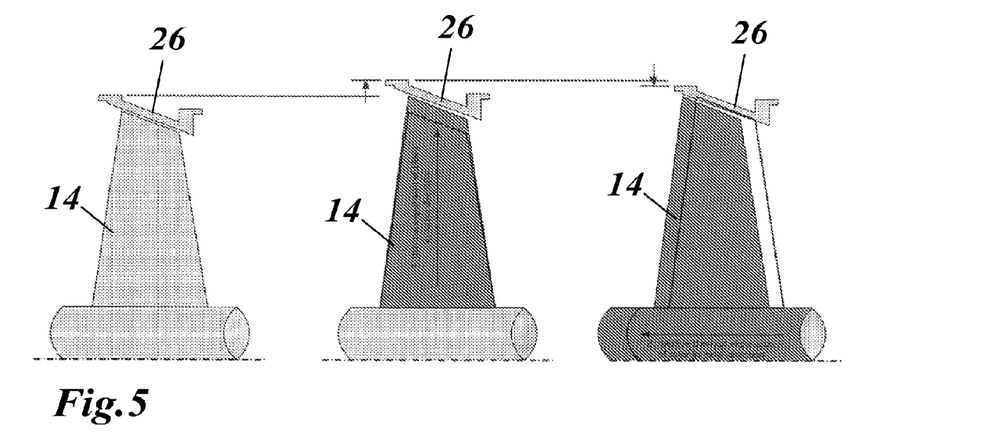
FIG. 5 shows a gap adjustment with respect to the thermal and/or centrifugal expansion by radially movable heat shields.

According to FIG. 5, when the blades 14 expand thermally in the radial direction, the heat shields 26 are moved in the same radial direction, in order to keep the clearance between rotor blades and heat shields constant (FIG. 5, central part). When the blades 14 are moved axially due to the thermal expansion of the rotor, the heat shields 26 are moved backwards in the radial direction (FIG. 5, right part).

Figure 6:
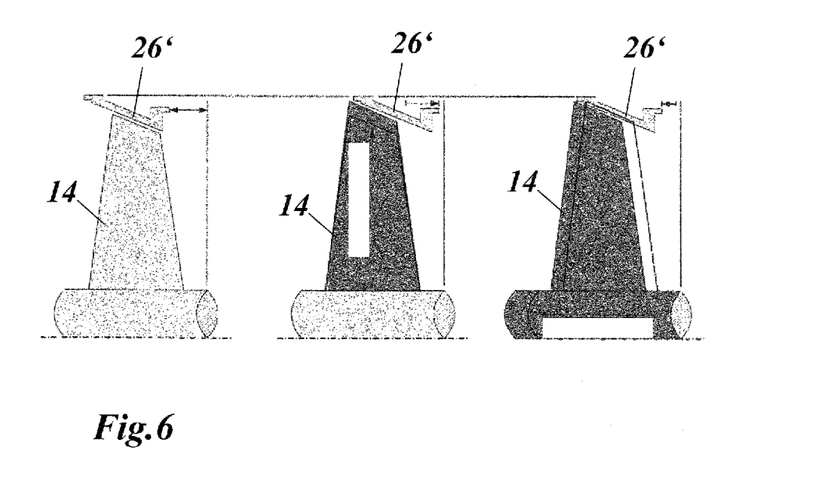
FIG. 6 shows a gap adjustment with respect to the thermal and/or centrifugal expansion by axially movable heat shields.

According to FIG. 6, when the blades 14 expand thermally in the radial direction, the heat shields 26' are moved in the axial direction in order to keep the clearance between the rotor blades 14 and heat shields 26' constant (FIG. 6, central part). When the blades 14 are moved axially due to the thermal expansion of the rotor, the heat shields 26' are moved backwards in the axial direction (FIG. 6, right part).

Figure 7:
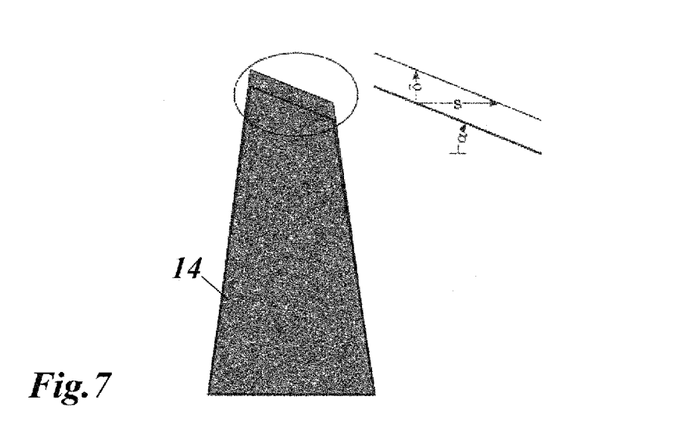
FIG. 7 explains the effective clearance for a sloped contact between casing and blade.

The required axial displacement "s" (see FIG. 7) of the heat shields depends on the change of radius "δ" of the outer surface of the blades and the angle "α" of the oblique outer surface of the blades with respect to the rotor axis (see also FIG. 6).

Figure 8:
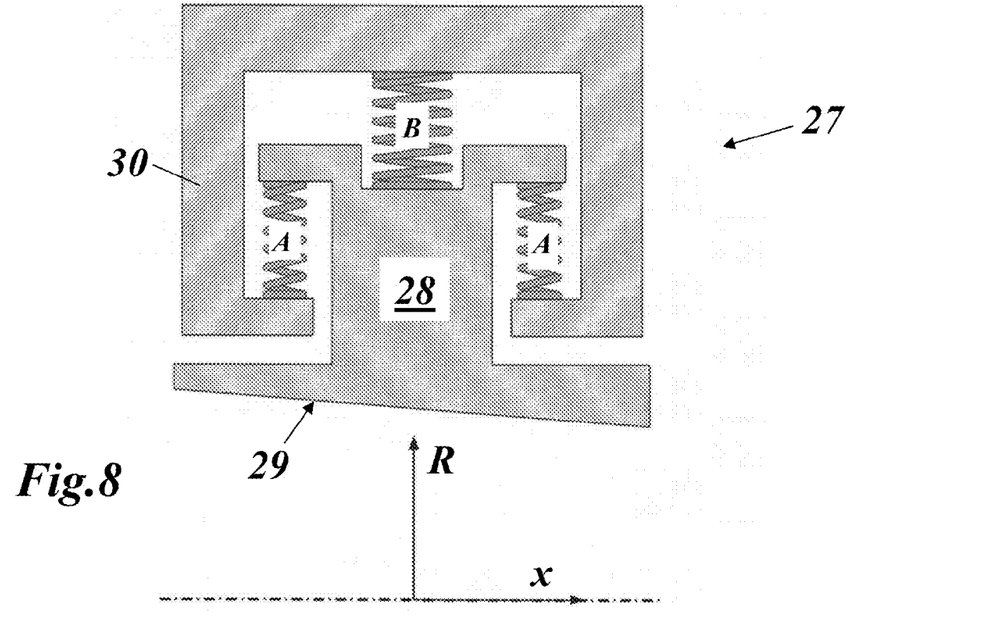
FIG. 8 schematically shows a radially movable heat shield with two different driving elements A and B made of a shaped memory alloy (SMA), or other materials showing similar properties, according to an embodiment of the invention.
Figure 9:
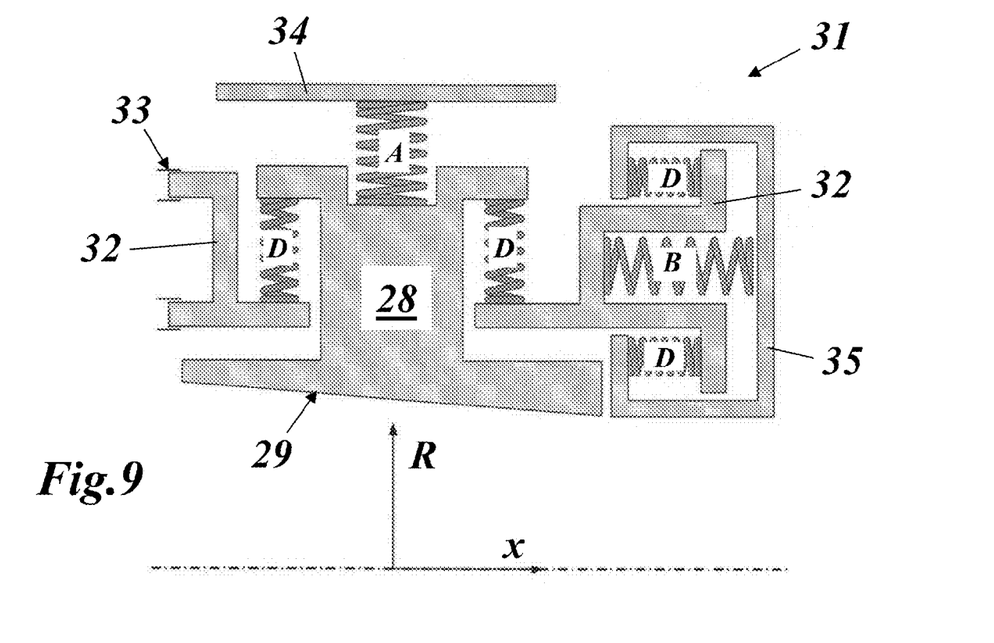
FIG. 9 schematically shows an axially and radially movable heat shield with two different driving elements A and B made of a shaped memory alloy (SMA), or other materials showing similar properties, and return springs D according to another embodiment of the invention.
Figure 10:
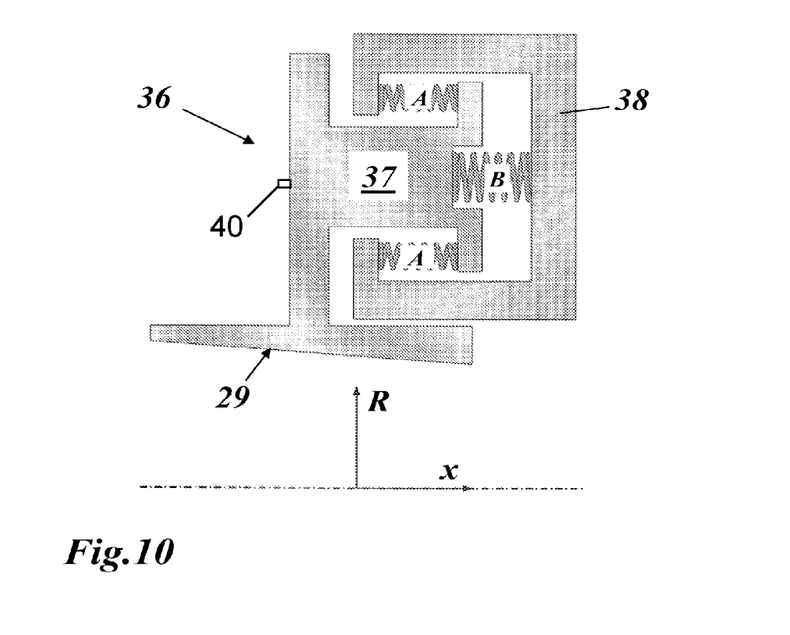
FIG. 10 schematically shows an axially movable heat shield with two different driving elements A and B made of a shaped memory alloy (SMA), or other materials showing similar properties, according to another embodiment of the invention.

FIGS. 8-10 illustrate some other possible configurations.

Radial Movement with Bidirectional Force (FIG. 8)

An increase of the gap by a relative axial movement of the rotor in the x-direction can be eliminated by a radial movement of the heat shield 28 with its conical surface 29 in the R-direction. In the embodiment shown in FIG. 8, the self-adjusting device 27 with an agonist-antagonist configuration of different SMA driving elements A and B between the heat shield 28 and its support 30 generates a radial movement of the heat shield 28 by bidirectional forces (FIG. 8).

Axial Movement with Bidirectional Force (FIG. 10)

Another embodiment, illustrated in FIG. 10, uses the same agonist-antagonist configuration within the self-adjusting device 36 with driving elements A and B and a support 38, as described in the embodiment of FIG. 8, but for axial movements of the heat shield 37. In this way, the gaps between adjacent heat shields are not impacted by movement.

Combined Radial/Axial Movement (FIG. 9)

Besides an exclusively radial or exclusively axial movement of heat shields, a combined radial/axial movement is also possible.

The embodiment shown in FIG. 9, which includes a self-adjusting device 31 with a heat shield 28, a first, movable support 32 with an axial guidance 33, a second, stationary support 35 for the first support 32, a third support 34 and driving elements A and B and return springs D, can generate planar movement by two driving elements or SMA packages A and B, which are arranged within a certain angle (90° in the example shown) to each other. In the configuration of FIG. 9 each of the driving elements or SMA packages A and B requires an additional return spring D for resetting.

In the embodiments shown so far, the force and stroke of the driving elements or SMA actuation devices A and B acted directly upon the heat shield to be moved. However, it is within the scope of the invention that the force and stroke of the driving elements can be adapted by a lever mechanism (not shown) to the required performance for actuation of the heat shields.

Place of Installation

Up to now, the available SMAs based on NiTi (where Ni and Ti mean Nickel and Titanium, respectively) cannot withstand the high temperatures existing at the heat shields of a gas turbine. Therefore, the self-adjusting SMA actuation device should be placed at a distance from the hot spot.

By placement of a high temperature sensor/switch 40 adjacent to the heat shields, a signal can be generated for activation of the driving elements or SMA devices. The activation can be realized by switching an electric current for Joule heating of the SMA or by manipulating a hot fluid flow to the SMA.

In this disclosure, different shape memory alloys, bimetals and/or other materials showing the required behavior, are taken into consideration. Their manufacturing and assembly into the component are not discussed here in detail, but they correspond to the state of the art the shape memory alloys and bimetal research and manufacturing.

For instance, NiTi-based shape memory alloys, whose allowable operation temperature is up to 200° C., can be considered within the hot root section of the blades by providing secondary airflow cooling available in the gas turbine engines.

Ternary high temperature NiTiX-alloys, where X can be Hafnium (Hf), Palladium (Pd), Gold (Au), Zirconium (Zr) or Platinum (Pt) extend the activation temperature to up to 800° C. and higher, as well as Iron (Fe)- and Copper (Cu)-based shape memory alloys.

LIST OF REFERENCE NUMERALS 10 turbo machine
11 axis
12 shaft
13 housing
14 blade
15 vane
16 fluid channel
17 foot
18 heat shield
19 chamber
20 outer surface
21 blade/vane tip
22,23,26,26' heat shield
24,30,32 support
25,27,31,36 self-adjusting device
28,37 heat shield
29 conical surface
33 guidance
34,35,38 support
40 high temperature sensor/switch
A,B driving element
C clearance
Cb blade clearance (radial)
Cv vane clearance (radial)
Cpp pinch-point clearance
Css standstill clearance
Cnom nominal clearance
D return spring
R radius
S-U start-up condition
S-S steady-state condition
t time
T temperature
TA ambient temperature
Tn nominal gas temperature
Tmn nominal metal temperature
x axial distance (arbitrary)

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A self-adjusting device for controlling a clearance between rotating and stationary components of a thermally loaded turbo machine, said rotating and stationary components include rotating blades, stationary vanes, or both, said rotating blades and/or stationary vanes including respective blade or vane tips and associated heat shields arranged opposite to the respective blade or vane tips, and wherein the self-adjusting device is drivingly connected to at least one of said associated heat shields, and which clearance changes in a non-linear way in a time-span during transition of the turbo machine between standstill and steady-state operation or during transition of the turbo machine between steady-state and standstill operation, the self-adjusting device comprising:

at least two different driving elements configured and arranged to move the rotating and stationary components relative to each other and to change said clearance when positioned in said turbo machine, wherein the at least two different driving elements are configured and arranged to be automatically activated when a predefined activation temperature is reached and configured to be activated at different times within said time-span during said transition of the turbo machine, and wherein the at least two different driving elements have different activation temperatures and are arranged within the self-adjusting device such that the at least two different driving elements experience a same temperature or nearly same temperature condition within the self-adjusting device during the transition of the turbo machine, and wherein the at least two different driving elements have at least a first activation temperature and a second activation temperature during transition of the turbo machine from standstill to steady-state operation, the first activation temperature configured to move the at least one of said associated heat shields movably mounted in a support of the stationary component away from said respective blade or vane tips of the rotating component and the second activation temperature configured to move the at least one of said associated heat shields toward the respective blade or vane tips of the rotary component, and wherein the second activation temperature is greater than the first activation temperature, wherein the support includes a first, movable support with an axial guidance, a second, stationary support for the first, movable support, and a third support;

return springs; and wherein the at least two different driving elements and the return springs generate planar movement by the at least two different driving elements, which are arranged within a certain angle to each other.

2. The self-adjusting device according to claim 1, wherein the at least two different driving elements are arranged at a 90 degree angle to each other.

* * * * *